United States Patent [19]

Rice

[11] Patent Number: 4,894,068

[45] Date of Patent: Jan. 16, 1990

[54] PROCESS FOR CAPTURING NITROGEN FROM AIR USING GAS SEPARATION MEMBRANES

[75] Inventor: Arthur W. Rice, O'Fallon, Mo.

[73] Assignee: Permea, Inc., St. Louis, Mo.

[21] Appl. No.: 289,836

[22] Filed: Dec. 27, 1988

[51] Int. Cl.⁴ .......................................... B01D 53/22
[52] U.S. Cl. ........................................ 55/16; 55/68
[58] Field of Search ........................... 55/16, 68, 158

[56] References Cited

U.S. PATENT DOCUMENTS

| | | | |
|---|---|---|---|
| 2,617,493 | 11/1952 | Jones | 55/16 |
| 2,970,106 | 1/1961 | Binning et al. | 55/16 X |
| 4,119,417 | 10/1978 | Heki et al. | 55/16 X |
| 4,130,403 | 12/1978 | Cooley et al. | 55/16 |
| 4,230,463 | 10/1980 | Henis et al. | 55/16 |
| 4,264,338 | 4/1981 | Null | 55/16 |
| 4,435,191 | 3/1984 | Graham | 55/16 |
| 4,474,586 | 10/1984 | Rice | 55/16 |
| 4,497,640 | 2/1985 | Fournié et al. | 55/16 |
| 4,556,180 | 12/1985 | Manatt | 5/158 X |
| 4,597,777 | 7/1986 | Graham | 55/16 |
| 4,659,343 | 4/1987 | Kelly | 55/16 |
| 4,675,030 | 6/1987 | Czarnecki et al. | 55/16 |
| 4,676,808 | 6/1987 | Coplan | 55/158 |
| 4,690,695 | 9/1987 | Doshi | 55/16 |
| 4,701,187 | 10/1987 | Choe et al. | 55/16 |
| 4,734,106 | 3/1988 | Gollan | 55/16 |

FOREIGN PATENT DOCUMENTS

| | | | |
|---|---|---|---|
| 0110858 | 6/1984 | European Pat. Off. | 55/16 |
| 53-051183 | 5/1978 | Japan | 55/158 |
| 54-061096 | 5/1979 | Japan | 55/16 |
| 60-231405 | 10/1985 | Japan | 55/158 |
| 63-151332 | 6/1988 | Japan | 55/16 |

*Primary Examiner*—Robert Spitzer
*Attorney, Agent, or Firm*—Martha A. Michaels

[57] ABSTRACT

Nitrogen gas of high purity is produced from compressed air by contacting the air with a first gas membrane separator permitting oxygen to permeate therethrough selectively while restraining the passage of nitrogen. The nonpermeant gas is then brought into contact with a second gas membrane separator of similar construction. The use of the serially arranged separators provides nitrogen gas with very low levels of oxygen.

5 Claims, 2 Drawing Sheets

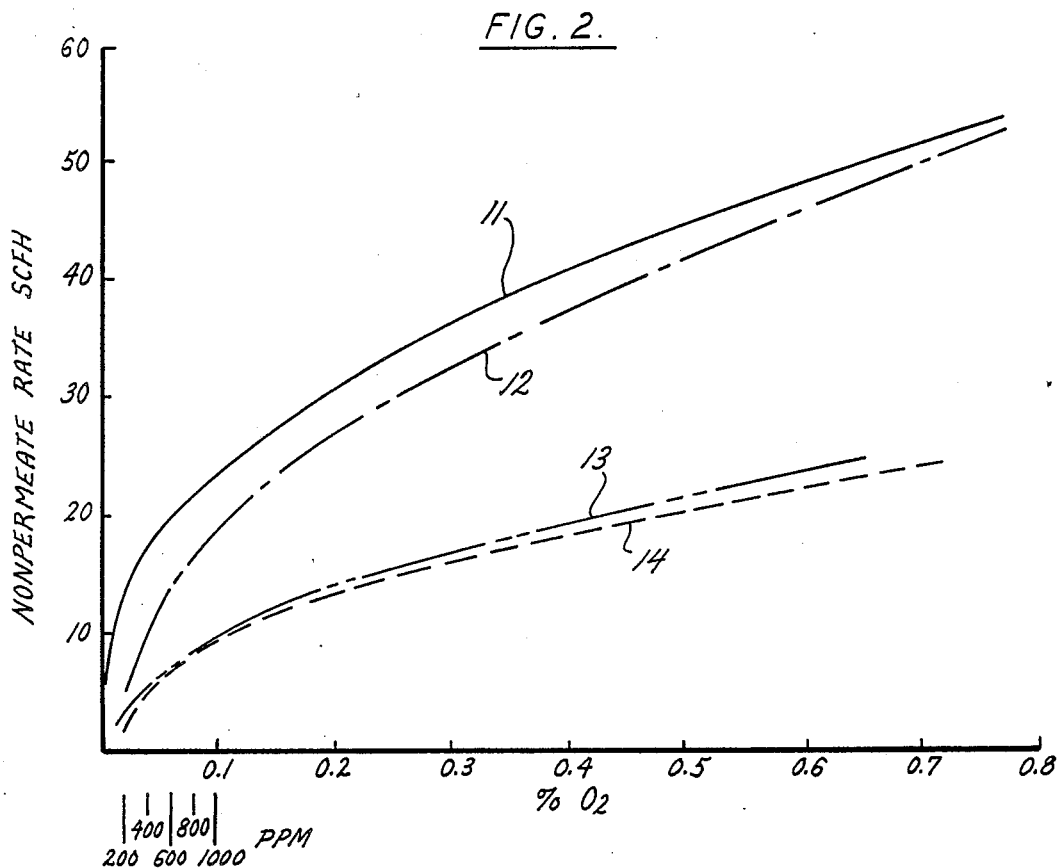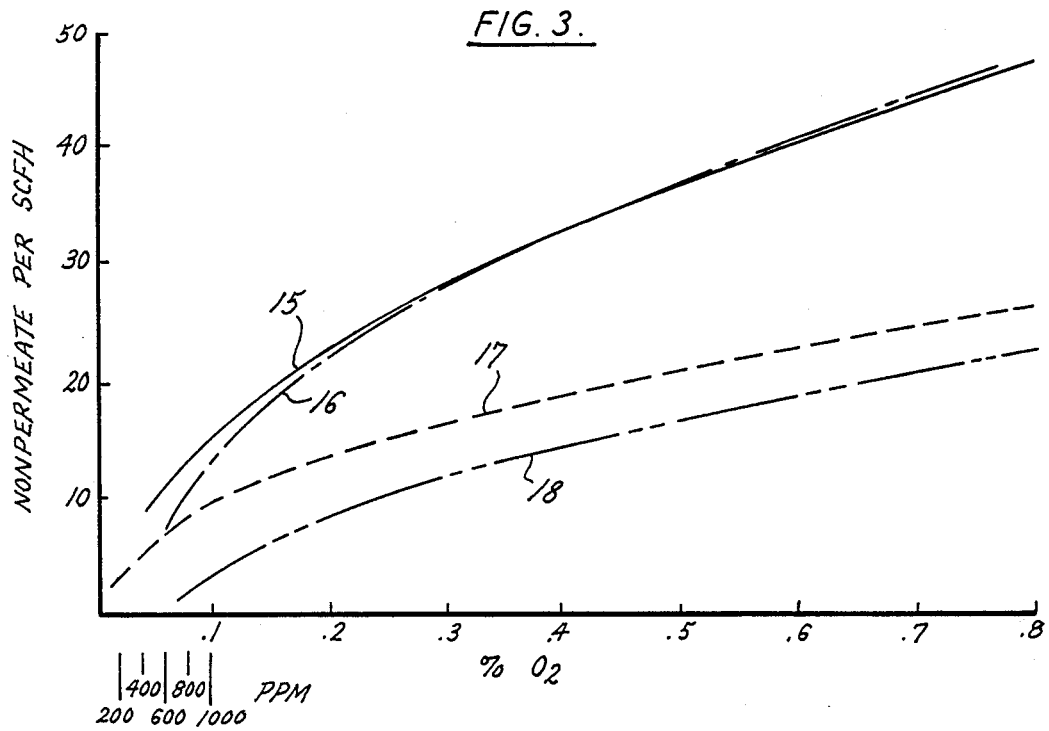

PROCESS FOR CAPTURING NITROGEN FROM AIR USING GAS SEPARATION MEMBRANES

BACKGROUND OF THE INVENTION

A. Field of the Invention

The present invention relates to a method useful for separating one gas from a mixture of gases. More particularly, the present invention relates to a method for producing in a highly effective and efficient procedure relatively pure nitrogen from air utilizing a plurality of serially arranged bundles of hollow fiber membranes.

B. Prior Art

Membranes have been employed which use the principle of selective permeation to separate mixtures of gases into various components. Each gas has a characteristic permeation rate that is a function of its ability to dissolve into and diffuse through a given membrane. It is also known to utilize a bundle of hollow fiber membranes positioned within an elongated shell for separating one or more gases from a mixture of gases by allowing gases to permeate selectively through the membrane. For example, it is known to make relatively pure nitrogen from air by moving air under pressure into one end of an elongated container filled with a plurality of juxtaposed axially hollow membrane fibers running longitudinally of the container. Oxygen, carbon dioxide, water and other gases will permeate through the membrane fibers; but nitrogen will permeate to a lesser extent. The gases passing through the membrane and separated from air are withdrawn from the downstream side of the membrane. As a result the portion of the air which does not permeate the membrane fibers after contact with the active membrane surface is relatively pure nitrogen. The nitrogen gas will inevitably have a small amount of oxygen. Normally, reducing the flow rates of the air through the container housing the hollow membrane fibers will result in greater separation of the unwanted gases of high permeability from nitrogen. Slowing down the air flow rates results in more separation but with a resulting expensive operational cost. The driving force in the gas separating membranes is the difference between a stream component's partial pressure on the upstream surface of the membrane and the partial pressure on the downstream surface of the membrane. Obviously, it would be desirable to provide a process where for a given flow rate and driving force, one is able to produce nitrogen even less contaminated with other gases such as oxygen, carbon dioxide and water vapor.

Using air as the gas source, membrane gas separators are commercially and economically employed to provide a relatively inert gas by separating most of the oxygen from the gaseous components of the air, thereby leaving mostly nitrogen. Unfortunately, the removal of the oxygen is not sufficiently complete for many purposes. However, it has been practical to reduce the oxygen content to about 0.5 to 5% by using membrane gas separators.

Gas membrane separators arranged in series have been disclosed for separating gases, such as for recovering hydrogen from mixtures of hydrogen and methane. The capturing of relatively pure nitrogen with levels of oxygen below 1000 ppm using serially arranged separators without the need of recycle loops or interstage compressors has not been known.

Series operation of membrane separator units has been previously used for gas separations but always where the higher pressure feed gas was on the external surfaces of hollow fibers and where series operation was employed principally to improve gas mixing and distribution efficiencies on the feed side of the hollow fiber membranes. Additionally, series operation of membrane separators has been previously employed in applications where it was beneficial to operate a first separator at a higher pressure than subsequent separators in the serial train of units. In these cases too, feed gases were contacting the external surfaces of the hollow fiber membranes.

There remains a need to produce from air an inert gas with much lower levels of oxygen at economically acceptable throughput rates. Inert gases having oxygen levels in the range of 0.1% (1,000 ppm) or less are required when the inert gas is used to purge or blanket certain chemical processes, analytical instruments, flammable materials and other specialized applications. Heretofore, the production of nitrogen with such low levels of oxygen at acceptable throughput rates has not been satisfactorily accomplished using membrane separators.

Inert gases containing less than 1,000 ppm oxygen are currently prepared for commercial use by alternative processes, such as pressure swing adsorption, catalytic converters, cryogenic separation and the like. There is a need to provide a more economical process for the generation of substantially pure nitrogen from air wherein the level of oxygen in the nitrogen is below levels of 1,000 ppm.

SUMMARY OF THE INVENTION

In accordance with the present invention an economical process is provided for producing from air an inert gas having an oxygen level of 1,000 ppm or less. This is accomplished by employing serially arranged membrane gas separation units without intermediate compressional forces being applied to the process gases. Preferably, each of the membrane separation units is composed of a plurality of hollow fiber membranes positioned within an elongated shell or container.

The process of the present invention provides capturing relatively pure nitrogen gas from air. First, air is compressed from a source. The compressed air is moved through a line entering the feed inlet end and through the bores or lumens of a first bundle of hollow fiber membranes. Such membranes are confined in a first container and are adapted to permit selectively permeation therethrough of oxygen, carbon dioxide and water vapor impurities while restraining the passage therethrough of nitrogen. A pressure differential is maintained between the bore surfaces of the hollow fiber membranes and the external surfaces of the hollow fiber membranes. The nonpermeant gas flows longitudinally through the length of the bores of the hollow fiber membranes and eventually exits the ends of the bores of the first set of hollow fiber membranes at the end of the first container opposite the feed inlet end. In a subsequent set or sets of hollow fiber membranes the nonpermeate from the first membrane bundle then flows as feed to the inlet end of the bores of the bundle of hollow fiber membranes contained in the second separator or subsequent serially arranged containers. The resulting permeant gas exiting from the external surface of the first bundle of hollow fiber membranes which has passed through the membrane from bore surface to external surface of the fibers is enriched in undesirable impurities, such as oxygen, carbon dioxide and water vapor. This permeant stream is vented to disposal or collected for other uses. The second bundle of membranes are also adapted to permit selectively the permeation therethrough of oxygen, carbon dioxide and water vapor while restraining the passage therethrough of nitrogen. Similar to conditions in the first container, a pressure differential is maintained between the bore surface of the hollow fiber membranes and the external surface of the hollow fiber membranes in the second container. The nonpermeant gas moves longitudinally through the bores of the hollow fiber membranes in a second container and out the ends of the hollow fiber membranes from the second container opposite the inlet end. The nonpermeant gas which is composed substantially entirely of nitrogen is removed from the exit ends of the bores of the final membrane bundle and collected or confined under pressure for further use. Preferably, the hollow fiber membranes are asymmetric and constructed of polysulfone polymer. More preferably, the hollow fiber membranes are constructed of polysulfone polymers which have been coated with a suitable coating, such as silicone. In practice, such coated hollow fiber membranes are longitudinally disposed within an elongated container and sealed so that the permeant gases can be collected and/or disposed of; and the nonpermeant gases can be removed from the final serially arranged container as purified product for use in inerting or other applications.

The process of the present invention effectively removes substantially all of the oxygen, carbon dioxide and water from compressed air. Thus, the present invention provides an effective and economical process for generating from air substantially pure nitrogen having at most only trace amounts of oxygen. A significant increase in separation efficiency for producing from air nitrogen having such a low level of impurity gases, such as oxygen, by the serial arrangement of a plurality of membrane gas separators is surprising and unexpected. The use of a serial plurality of separators results in a significant increase in performance as compared to the performance of two similar separators operated in parallel or compared to the performance of one larger separator having a membrane surface area comparable to the sum of the areas of the two smaller separators.

DESCRIPTION OF THE DRAWINGS

FIGS. 2 and 3 are graphs illustrating the improved efficiency of oxygen removal from air at various flow rates when membrane gas separators are used in series in accordance with the present invention as compared with the same separators as used in parallel as depicted in these FIGS. as the algebraic sum of the performance of the individual separators.

DETAILED DESCRIPTION OF THE INVENTION

Figure 1:
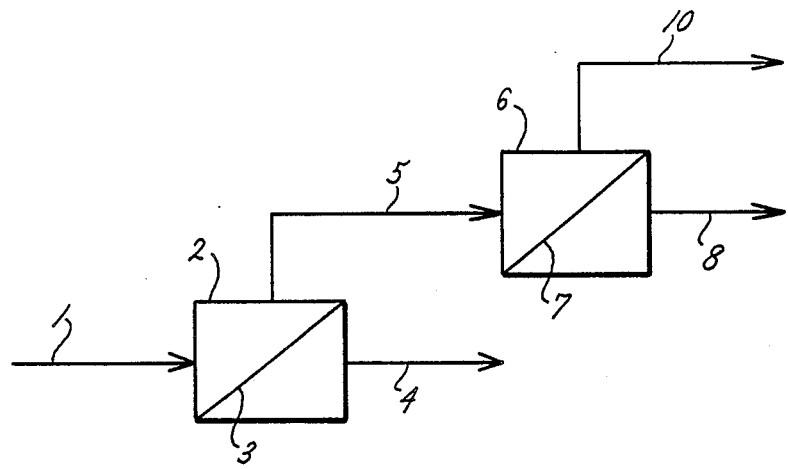
FIG. 1 is a schematic view showing apparatus suitable for carrying out the process of the present invention.

With reference now in detail to the drawings, as shown in FIG. 1 numeral 1 denotes a feed line adapted for carrying compressed air. Compressors of conventional designs can be used to place the air under compression and to provide for a suitable pressure differential across the membrane of the gas separator. The compressed air flows into a separator bundle in confined zone 2. Dividing zone 2 into two sections is a first gas separation membrane 3. Because of the construction of the separator, the nature of the membrane and the pressure differential across the membrane, the high permeability components (oxygen, carbon dioxide, and water vapor) in the air will permeate through the membrane and be carried out of the downstream side of zone 2 through line 4 for further processing or disposal.

The nonpermeate material is carried from zone 2 after contact with membrane 3 by line 5 to a second separator bundle in confined zone 6. Dividing the second zone 6 into two sections is a second gas separation membrane 7. Because of the construction of the separator, the nature of the membrane, and the pressure differential across the membrane, remaining gaseous impurities, such as oxygen, carbon dioxide and water vapor will permeate selectively through the membrane and exit zone 6 via vent line 8. Nitrogen gas of high purity will exit zone 6 through nonpermeate product line 10 for further processing or use. The level of oxygen in the nonpermeate gas may be very low, in the range of less than 2,000 ppm achieved at realistically economical throughput rates of the gas. The nonpermeate product nitrogen exits through line 10 at high pressure, essentially that of the feed compressed air having undergone very little pressure drop through the separator systems.

Preferably, the serially arranged gas separators use bundles of juxtaposed hollow fiber membranes positioned lengthwise in one or more elongated nonpervious containers for separating one or more components from a mixture of gases by allowing certain gases selectively to permeate through the walls of the hollow fiber membranes. In the present invention, nitrogen and argon will be selectively captured from other higher permeability gas components present in the compressed air feed. The hollow fiber membranes are preferably asymmetric and made from a polymeric material, such as polysulfone.

The feed gas mixture enters the bores at the inlet end of the hollow fibers and moves axially along the bores while contacting the membrane. Nonpermeate gases of low permeability are exhausted at the exit ends of the bores, while higher permeability gases are selectively transported via permeation through the membrane to the downstream, lower pressure side of the membrane, where they are exhausted to vent, disposal or may be collected for other uses. Normally, the hollow fibers are positioned lengthwise within a tubular shell or like container. The driving force for selective permeation of gas through the walls of the hollow fiber membrane is the difference between the gas partial pressure at the upstream (bore or inside) surface of the hollow fiber membranes and the gas partial pressure existing downstream at the external surface of the hollow fiber membranes. Thus, as a pressurized gas flows along and through the bores or lumens of the hollow fibers, higher permeability components such as oxygen, carbon dioxide, water vapor, etc. will permeate through the fiber walls and may be collected as they exit the lower pressure region of the container or may be exhausted to vent disposal or collection for other uses. The nonpermeate gas (nitrogen) in the case of air exits from the separator at essentially the same pressure as the feed gas. The nonpermeate gas from the first separator is then fed to the inlet of a similar second serially arranged membrane separator where additional refining of the gas into exceedingly pure nitrogen occurs in like manner.

Although more than two membrane gas separator units may be used in series, it has been found that the use of two gas separators arranged in series in accordance with the present invention may be entirely adequate and suitable for most purposes in capturing relatively pure nitrogen from air.

The passage of gas through a membrane can proceed through pores, i.e. continuous channels for gas flow in communication with both feed and exit surfaces of the membrane. Small diameter pores may be capable of separating gases by Knudsen flow or diffusion. In another mechanism, in accordance with current views of gas separation membrane theory, the passage of a gas through the membrane may be by interaction of the gas with the material of the membrane. In this latter postulated mechanism, the permeability of a gas through a membrane is believed to involve the solubility of the gas in the membrane material and the permeability constant for a single gas is presently viewed as being the product of the solubility and diffusivity of the gas in the membrane. A given material has a particular permeability constant for passage of a given gas by the interaction of the gas with the material of the membrane. The rate of permeation of the gas, i.e., flux through the membrane, is related not only to the permeability constant but is also influenced by variables such as the membrane thickness, density, free volume, the physical nature of the membrane, the partial pressure differential of the permeate gas across the membrane, the operation temperature and like factors.

Suitable gas separation membranes are disclosed in U.S. Pat. No. 4,230,463, herein incorporated by reference. A multicomponent membrane for gas separation comprised of a coating in contact with a porous separation membrane is disclosed therein with the separation properties of the multicomponent membrane being principally determined by the materials of the porous separation material as compared to the membrane material of the coating.

Furthermore, improved gas separation membranes are disclosed in application Ser. No. 296,843, filed Feb. 2, 1989 which is a continuation of U.S. patent application Ser. No. 66,752, filed Jul. 6, 1987, now abandoned both having common ownership herewith. Such application is incorporated herein by reference thereto. These improved membranes, particularly in accordance with the present invention, may be asymmetric gas separation membranes having graded density skin and macrovoid-free morphology comprised of glassy, hydrophobic polymers where the membranes have increased free volume as evidenced by the membrane first heat Tg which is greater than the first heat Tg of a bulk sample of the glassy, hydrophobic polymers. The membranes may exhibit high permeabilities and the potential for intrinsic separation factors realized after the porous defects of the membrane are sealed with a highly permeable silicone polymer or similar coating material. The membranes exhibit permeabilities which are much greater than other known asymmetric membranes made from the same polymer, for example, as taught by U.S. Pat. No. 4,230,463.

Coatings may be in the form of an essentially noninterrupted membrane, i.e., an essentially nonporous membrane, in contact with the porous separation membrane, or the coating may be discontinuous or interrupted. When the coating is interrupted, it is sometimes referred to as an occluding material since it may occlude channels for gas flow, i.e. pores. Preferably, the coating is not so thick so as to adversely affect the performance of the gas separation membrane, e.g., by causing an undue decrease in flux or by causing such a resistance to gas flow that the separation factor of the coated membrane is essentially that of the coating. Often the coating may have an average thickness of up to about 10 microns.

A separation factor ($\gamma a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability ($P_a/1$) of a membrane of thickness 1 for gas a of a gaseous mixture to the permeability ($P_b/1$) of the same membrane to gas b, wherein the permeability for a given gas is the volume of gas, standard temperature and pressure (STP), which passes through a membrane per square centimeter of surface area, per second, for a partial pressure drop of one centimeter of mercury across the membrane per unit of thickness, and is expressed as $P/1 = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang, et al., *Techniques of Chemistry*, Volume VII, *Membranes in Separations*, John Wiley & Sons, 1975 (herein incorporated by reference) at Chapter 12, pages 296 to 322.

In practical terms, the permeability and separation properties of a membrane system in accordance with the present invention must be sufficient to effectively remove impurities from the feed compressed air while providing adequate efficiency of production of exceedingly pure nitrogen, e.g., having an oxygen content of less than 1000 ppm preferably less than 100 ppm at an economically acceptable production rate. Permeability of oxygen, carbon dioxide and water vapor also must be sufficiently high to achieve refining of the feed compressed air to yield nitrogen of extremely low oxygen concentration, low moisture dew point and low residual carbon dioxide concentration. Selectivity properties must be sufficiently high, i.e., for selective transport of oxygen, carbon dioxide, and water vapor relative to nitrogen such that excessive loss of feed is avoided in order to provide a membrane purification system which is of practical size and cost so that the process will be economically attractive. The separation factor of oxygen, carbon dioxide and water vapor with respect to nitrogen should be greater than 4, 20 and 50, respectively when tested at conditions of 50 to 500 psig and at about 30° C.

In the practice of the invention as illustrated in the examples which follow, there is shown a process for producing high quality gas for applications requiring high purity nitrogen utilizing relatively compact modules (three inch diameter by three foot long modules and three inch diameter by two foot long modules) containing longitudinally disposed hollow fiber gas separation membranes in capturing high purity nitrogen gas from air. Flow rates of up to 10 standard cubic feet per hour (SCFH) of purified product gas, i.e., nitrogen having less than 1,000 ppm were achieved from feed compressed air at 120 psig ($8.3 \times 10^5$ Pa) through the use of the serially arranged membrane gas separation system of this invention.

Initially nonpermeate product gas exiting the system was set at about 1 SCFH to establish equilibrium in the system before measurements were made. Subsequent measurements of product gas composition showed, that operating at feed compressed air pressures in the range of 90-150 psig (6.2-10.3 × 10$^5$Pa), at feed dew points of about +5° to +15° C. and at ambient laboratory temperatures of 20°-25° C., the serially arranged system produced high quality nonpermeate nitrogen gas with very low levels of oxygen relative to the inlet feed air composition. Flow rates of nonpermeate product gas were tested in the range of from about 10 SCFH to 50 SCFH rates. Lower product gas flows allow longer effective contact times between the feed air and the active membrane surface. Thus, at flow rates of about 10 SCFH the oxygen content in the product is lower than at 20 SCFH rates, etc. with other conditions being constant.

It is to be understood that the detailed description of the present invention including the following examples are given merely by way of illustration and that many modifications may be made therein without departing from the spirit or scope of the present invention. In the examples all percentages are given on a volume basis unless otherwise indicated.

EXAMPLE I

This example illustrates the preparation of the membrane gas separators which may be used in accordance with the present invention.

All of the hollow fibers used in the described test were spun by a standard wet spinning process. Deaerated dope was delivered at a rate of up to 20 ml/min to a tube-in-orifice type spinnerette. The spinnerette was maintained at a temperature of up to about 80° C. by the application of sufficient heat to maintain adequate dope flow. Water was injected into the fiber lumen at a rate of up to 10 ml/min to form the nascent hollow fibers which were drawn at a rate of up to 100 m./min. The fibers were drawn while moving through water baths maintained at temperatures of about 0°-30° C. The hollow fibers were then washed with water. The fibers were wound onto a bobbin and washed continuous for 1 to 5 days in running water. Skeins (parallel bundles) of hollow fibers were then formed. These skeins were hung vertically and dried rapidly at about 100° C.

The polysufone hollow fiber membranes used in the examples were spun from a solution of polysufone polymer (P-3500, Amoco Performance Polymers Co.) dissolved in a mixture of N-methylpyrrolidone solvent (57 weight %) and propionic acid nonsolvent (43 weight %). The spinning solution contained 37% polymer by weight. After spinning, washing and drying, bundles of the hollow fibers were potted into separator modules, which were coated with dilute solutions (about 0.5-2% by weight) of silicone (Sylgard, Dow Corning Co.) in isopentane solvent. After coating, the isopentane solvent was evaporated to provide the finish coated hollow fiber membrane separators.

EXAMPLE II

This example illustrates the preparation of the separation units used in the examples. Separator modules used were constructed of a plurality of fibers, which were potted at each end in an encapsulating epoxy to yield tube sheets. Each tube sheet was cut perpendicular to the fiber axis to open and expose the bores of the fibers to form a double-ended separator configuration. The potted bundles were placed in pressure vessels, such as aluminum or steel pipe, where O-ring gaskets effected a pressure tight seal between tube sheet and pressure vessel so as to isolate the bore feed inlet and the bore exit (nonpermeate) from the shell side (permeate) volume of the module. Feed compressed air was introduced into the bores at one end of the module under pressure (typically 85-130 psig, 5.9-9.0 × 10$^5$ Pa) and the gas flowed through the bore of the fibers, during which flow the gas was in contact with the inside surface of separation membranes. Fast permeating components in the feed (principally oxygen, water vapor and carbon dioxide) were transported by selective permeation across the membrane to the low-pressure side (permeate side) of the membranes which was typically at atmospheric pressure. Slow permeability components of the feed (principally nitrogen and to a small extent argon) were retained by the selective membrane and exited the bores of the fibers at the exit end of the module opposite the feed inlet. The nonpermeate product gas, which was substantially free of impurities, such as oxygen, water vapor and carbon dioxide initially present in the feed air, exited the bundle at essentially the same pressure as that of the feed gas, having undergone very little pressure drop through the modules (less than 5 psi, 3.5 × 10$^4$ Pa) under conditions of operation. The pressure of the permeate (shell side) of the membrane module was about one atmosphere. The permeate of each membrane device is directed longitudinally to produce a self-generated counter-current sweep. Permeate gas flow was adequate to sweep transported oxygen, water vapor and carbon dioxide out of the shell side of the module, thus maintaining a functionally low partial pressure of oxygen, water vapor and carbon dioxide on the permeate side of the membrane. The sweep flow maintained suitable partial pressure differential for oxygen, water vapor and carbon dioxide across the membrane to provide the necessary driving force for the separation via selective membrane permeation and transport.

In the following examples the hollow fiber membrane separators used were constructed of asymmetric gas separation membranes. The membranes used were silicone coated polysulfone hollow fibers enclosed in a shell and tube configuration with compressed air fed to the inside (or bores) of the hollow fibers. The packing factor of fibers within the separator shell was in the order of 50%. Each individual fiber had an outside diameter of about 450-500 microns and an inside diameter of about 200-250 microns. In Examples III and IV which follow, three membrane gas separators were assembled using the same procedures and were composed of different sections of the same manufactured spun fiber skeins.

EXAMPLE III

The separators used in this example (Unit A and Unit B) were constructed as 4" diameter × 3' long units and tested with the bore side feed air at about 120 psig, 21°-23° C. and with the permeate vented to atmosphere. Teledyne Hastings Model Nall linear mass flow meters were used to measure process gas flows. Oxygen concentrations were measured using a Servomex 540 A digital readout oxygen analyzer for percent ranges of oxygen down to about 0.2% and a Neutronics Trace Oxygen Analyzer Model 5903 for the lower range below 0.2% (0-2000 ppm) oxygen. Material balances were determined for oxygen to check operation at least once during each run, with all balances conducted found to be within +/−0.5% accuracy. The trace level (ppm) oxygen analyzer was checked with zero and calibration gases immediately prior to each test. Zero gas used was 4.5 grade cylinder nitrogen from a commercial vendor. Normal specifications indicate this gas contains less than 5 ppm oxygen. Test results are shown in Table 1 below.

In this example two separators of equivalent performance quality, referred to as Unit A and Unit B were used. FIG. 2 of the drawing shows curves which depict graphically the results of operation of each separator as individual units, as the algebraic sum of the two units if operated simultaneously in parallel, and the results of operating the two units in series. Series operation was with the nonpermeate from Unit A used as feed gas to Unit B. The shell side gases (permeate) of each unit in all cases were vented to the atmosphere.

With reference to the curves in FIG. 2, line 11 is a plot of the performance of Unit A and Unit B operated in series in accordance with the present invention. Line 13 is a plot of the performance of Unit A alone. Line 14 is a plot of the performance of Unit B alone. Line 12 is the algebraic sum of the performance of Unit A and Unit B depicting parallel operations.

From curves shown in FIG. 2 the following conclusions can be stated. At higher nitrogen product gas purities, i.e., lower oxygen remaining in the nonpermeate, the quantity of nonpermeate product for a given purity can be greatly increased when the separators are operated in series versus employment of individual units in parallel. The following table illustrates the increase in efficiency of the serially arranged system of two separators. It should be noted that the increase in efficiency (expressed as "% Gain for Series") values in Table 2 show improvements ranging from 11% at the level of 3000 ppm $O_2$ residual in the product nonpermeate gas to greater than 150% improvement at 200 ppm residual $O_2$.

TABLE 1

| Residual $O_2$ ppm | Flow (SCFH) of Nonpermeate Product Gas | | | | % Gain For Ser. |
|---|---|---|---|---|---|
| | Unit A | Unit B | Parallel | Series | |
| 3000 | 16.5 | 16.1 | 32.6 | 36.8 | 11 |
| 1000 | 9.7 | 9.7 | 19.4 | 23.8 | 23 |
| 600 | 7.0 | 6.8 | 13.8 | 20.2 | 46 |
| 400 | 5.5 | 5.0 | 10.5 | 17.6 | 68 |
| 200 | 3.2(est) | 2.4 | 5.6 | 14.1 | 152 |
| 65 | nm | nm | — | 6.2 | — | nm = no measurement

EXAMPLE IV

The separators used in this example were Unit B and Unit C and were constructed and tested in the same manner as in Example III. Unit C when tested separately was determined to be a lower performance quality device than either Unit A or Unit B. However, connecting in series arrangement the lower quality Unit C with Unit B resulted in a combination which in the low ppm residual oxygen range, less than 1000 ppm, showed equivalent performance quality to Unit B taken singly. This was surprising in that series operation made Unit C appear to perform as if it were a higher quality separator, although, the performances of the better (B) and poorer (C) units in series operation was of course not as good as in the case (Example III, FIG. 2) where both units were of higher quality. Furthermore, the two units connected in series, (nonpermeate from Unit B used as a feed to Unit C) produced a better product rate than when operated in parallel. This was especially surprising and unexpected because the second unit in the serial arrangement (Unit C) was the lower quality separator.

FIG. 3 of the drawing shows the unexpected improvement of the serial operation of the present invention for example. With reference to such FIG., line 15 is a plot of the performance of Unit B and Unit C operated in series. Line 17 is a plot of the performance of Unit B alone. Line 18 is a plot of the performance of Unit C alone. Here the inferior performance quality of Unit C is obvious compared to that of Unit B, when each is operated alone. Line 16 is the plot of the algebraic sum of the performance of Unit B and Unit C depicting parallel operation. Table 2 sets forth data indicating the performance increase of serially arranged units as compared to the same units operated individually and in parallel.

TABLE 2

| $O_2$ ppm | Flow (SCFH) of Nonpermeate Product Gas | | | | % Gain For Series |
|---|---|---|---|---|---|
| | Unit C | Unit B | Parallel | Series | |
| 3000 | 12.0 | 16.2 | 28.2 | 28.2 | 0 |
| 1000 | 3.7 | 9.8 | 13.5 | 15.3 | 13 |
| 800 | 2.0 | 8.5 | 10.5 | 13.4 | 28 |
| 600 | 1.0(est) | 7.0 | 8.0 | 11.2 | 40 |
| 400 | nm | 5.0 | nm | 8.6 | — | nm = no measurement

It can be noted that at residual $O_2$ levels of 1000 ppm, series operation gives an improvement resulting in a 13% increase in purified nonpermeate product gas flow and at 600 ppm $O_2$ residual an even larger 40% improvement in product flow.

EXAMPLE V

In this example two different 3" diameter separator units were employed. One unit was 2' long denoted as Unit D and the other was 3' long denoted as Unit E. The separators were operated individually and in series with the shorter one (Unit D) as the second unit in the series arrangement. Tests results are shown in Table 3. The data in the table illustrate the performance increase observed with series operations compared to the same units operated individually and in parallel, in the low ppm residual oxygen ranges in the nitrogen captured from air.

TABLE 3

| $O_2$ ppm | Flow (SCFH) of Nonpermeate Product Gas | | | | % Gain For Series |
|---|---|---|---|---|---|
| | Unit D | Unit E | Parallel | Series | |
| 600 | 4.9 | 6.4 | 11.3 | 11.3 | 0 |
| 400 | 4.2 | 5.4 | 9.6 | 9.8 | 2 |
| 200 | 3.3 | 4.2 | 7.5 | 8.0 | 9 |
| 100 | 2.4 | 3.1 | 5.5 | 6.5 | 18 |
| 50 | 1.5 | 2.0 | 3.5 | 5.7 | 63 |

It can be noted that at residual $O_2$ levels of 50 ppm in the nonpermeate product gas, series operation gives a gain of 63% in flow of product gas compared to parallel operations.

As can be seen, the process of the present invention effectively removes substantially all of the oxygen from compressed air resulting in relatively pure nitrogen gas.

The air is brought into contact with a first gas membrane component within a first confined zone, such membrane selectively permits oxygen, carbon dioxide and water from the air to permeate while restricting the permeation of the nitrogen component. A partial pressure differential exists between the contact side and the downstream or permeate side of the first membrane. The nitrogen rich portion of the air which does not permeate the first membrane is moved to a second confined zone containing a second membrane component, where it contacts the second membrane component unit. A partial pressure differential exists between the contact side and the permeate side of the second membrane. The second membrane permits selectively the permeation of essentially all of the remaining oxygen, carbon dioxide and water vapor while restricting the permeation of nitrogen. As a result, the nonpermeate gas exiting from the second membrane component is exceedingly pure nitrogen gas having an oxygen content in the range of 1,000 ppm or less.

The above illustrates that use of two serially arranged gas membrane separators in accordance with the process of the present invention produces purified nitrogen which contains less than 1000 ppm oxygen at production rates as high as 10 SCFH using small separator units. The result is the economic production of exceedingly pure nitrogen gas.

What is claimed is:

1. A process for producing refined relatively pure nitrogen gas wherein the oxygen level is less than about 2,000 ppm from air, the process comprising:
   (a) moving compressed air into a first separator containing a first set of a plurality of hollow fiber membranes confined in a container, the first separator being adapted to permit selectively the passage therethrough of oxygen, carbon dioxide and water vapor while restraining the passage therethrough of nitrogen;
   (b) maintaining a pressure differential between the bore surface of the hollow fiber membranes and the external surface of the hollow fibers membranes;
   (c) moving the resulting nonpermeate gas longitudinally through the bores of the hollow fiber membranes and out the ends of the hollow fiber membranes and from the first separator;
   (d) venting the resulting permeate gas from the external surfaces of the membranes in the first separator;
   (e) moving the resulting nonpermeate gas whose nitrogen content has been increased as compared to the source air and whose oxygen content has been significantly reduced as compared to the source air from the first separator without additional compressional forces being applied thereto into internal contact with a second separator containing a second set of a plurality of hollow fiber membranes confined in a container, the separator being adapted to permit selectively the passage therethrough of oxygen, carbon dioxide and water vapor while restraining the passage therethrough of nitrogen;
   (f) maintaining a pressure differential between the bore surface of the second set of hollow fiber membranes and the external surface of the second set of hollow fiber membranes;
   (g) moving the nonpermeate gas longitudinally through the bores of the second set of hollow fiber membranes and out the ends of the second set of hollow fiber membranes and from the second separator;
   (h) venting the resulting permeate gas from the external surfaces of the membranes in the second separator; and
   (i) thereafter collecting under pressure the nonpermeate gas from the second separator.

2. The process of claim 1 wherein the hollow fiber membranes are constructed of polysulfone polymer.

3. The process of claim 2 wherein the polysulfone polymer is coated with silicone or rubber.

4. The process of claim 1 wherein the permeate gases and conpermeate gases flow counter currently with respect to each other in both separators.

5. The process of claim 1 wherein more than two separators are arranged in series.

* * * * *